(12) United States Patent
Novoselov (10) Patent No.: US 9,568,727 B2
(45) Date of Patent: Feb. 14, 2017

(54) ELECTROWETTING DISPLAY PIXEL ARCHITECTURE

(71) Applicant: Amazon Technologies, Inc., Reno, NV (US)

(72) Inventor: Pavel Novoselov, Eindhoven (NL)

(73) Assignee: Amazon Technologies, Inc., Seattle, WA (US)

(*) Notice: Subject to any disclaimer, the term of this patent is extended or adjusted under 35 U.S.C. 154(b) by 41 days.

(21) Appl. No.: 14/224,989

(22) Filed: Mar. 25, 2014

(65) Prior Publication Data

US 2015/0277100 A1    Oct. 1, 2015

(51) Int. Cl.
*G02F 1/29*    (2006.01)
*G02B 26/00*   (2006.01)

(52) U.S. Cl.
CPC .................. *G02B 26/005* (2013.01)

(58) Field of Classification Search
CPC ............. G02B 26/0841; G02B 26/001; G02B 26/0833; G02B 26/02; G09G 3/3466
USPC .......... 359/245, 250–253, 290–299
See application file for complete search history.

(56) References Cited

U.S. PATENT DOCUMENTS

2009/0316253 A1*  12/2009  Fairley .............. G02B 26/004
                                                              359/292
2010/0053728 A1    3/2010  Lin et al.
2010/0110532 A1    5/2010  Takemoto et al.
2013/0128335 A1    5/2013  Parry-Jones et al.
2013/0271817 A1*  10/2013  Jung et al. .............. 359/290
2014/0022622 A1    1/2014  Park et al.

OTHER PUBLICATIONS

The PCT Search Report and Written Opinion mailed Jun. 26, 2015 for PCT application No. PCT/US2015/022049, 10 pages.

* cited by examiner

*Primary Examiner* — Scott J Sugarman
*Assistant Examiner* — Vipin Patel
(74) *Attorney, Agent, or Firm* — Lee & Hayes, PLLC (57) ABSTRACT

The subject matter disclosed herein relates to reduction of effective voltage drops within pixels in active matrix displays such as electrowetting display devices. The electrowetting display device comprises a plurality of pixel areas, wherein each pixel area comprises a hydrophobic surface, a first fluid and a second fluid on the hydrophobic surface, wherein the first fluid is immiscible with the second fluid, and a pixel electrode under the hydrophobic surface, wherein the pixel electrode has a substantially U-shape. A thin film transistor is coupled to the pixel electrode and a voltage source. Voltage via the thin film transistor and the voltage source applied to the hydrophobic surface via the pixel electrode causes the hydrophobic surface to become more hydrophobilic to thereby move the second fluid onto the hydrophobic surface to thereby substantially displace the first fluid on the hydrophobic surface.

16 Claims, 5 Drawing Sheets

ELECTROWETTING DISPLAY PIXEL ARCHITECTURE

BACKGROUND

Figure 1:
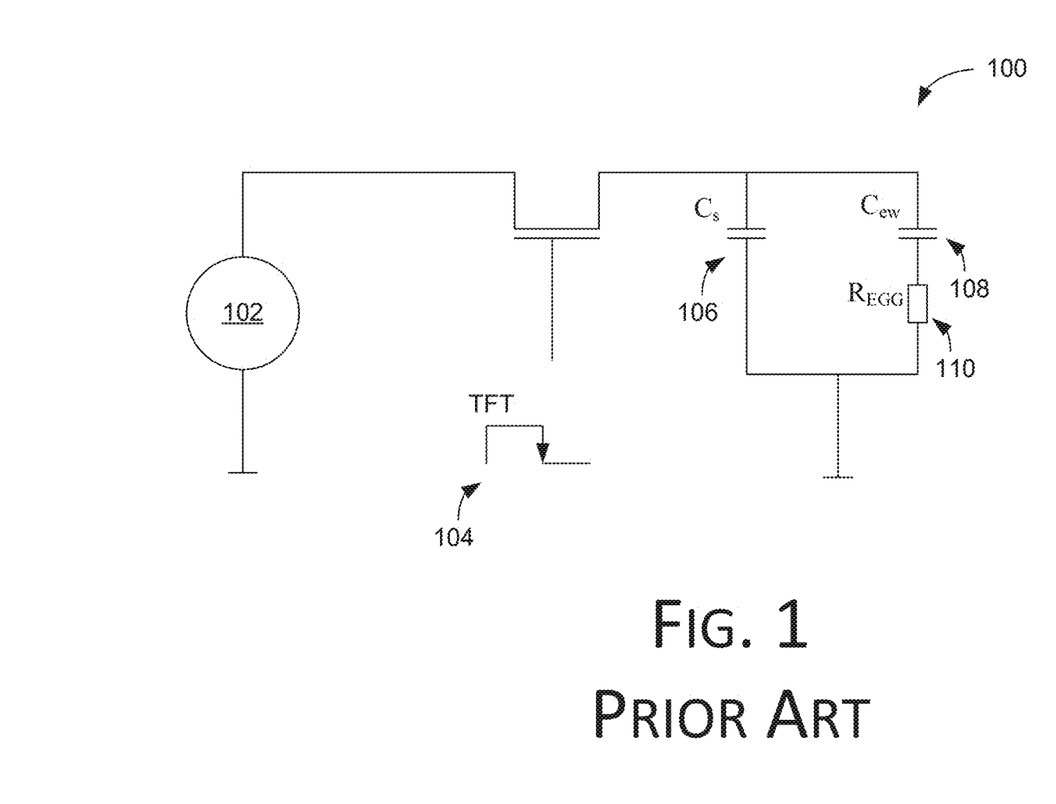
FIG. 1 is a schematic view of a pixel area of an electrowetting display represented as a simplified circuit.

Many portable electronic devices include displays for displaying various types of images. Examples of such displays include electrowetting displays (EWDs), liquid crystal displays (LCDs), electrophoretic displays (EPDs), light emitting diode displays (LED displays), etc. In electrowetting displays, the resistance of the electrolyte in a fluid in the pixel areas decreases the effective voltage of the pixel area. FIG. 1 illustrates a pixel area 100 represented as a simplified circuit. As can be seen, the pixel area 100 can be represented as including a voltage source 102, a thin film transistor (TFT) 104, storage capacitance $C_s$ 106, capacitance of the area of the pixel's electrode $C_{ew}$ 108 and $R_{EGG}$, which represents the resistance of the electrolyte.

Equation 1 below illustrates the relationship of the parameters that influence the voltage drop in the pixel area 100, where t line is a line time, $V_{out}$ equals $V_{source}$ minus $V_{kb}$, where $V_{kb}$ is the kickback voltage drop present in all active matrix displays. As previously noted $C_{ew}$ is a pixel capacitance that is related to the area of the pixels' electrode, and $C_s$ is a storage capacitance of the pixel area.

$$V_{REGGdrop} = \left[V_{out} - V_{out} * \left(1 - \exp\left(\frac{-t_{line}}{R_{EGG} * C_{EW}}\right)\right)\right] * \left[\frac{C_{EW}}{(C_S + C_{EW})}\right] \quad (1)$$

In conventional electrowetting displays, the pixel electrode is a flat layer underneath the pixel area and thus, has a large area. Accordingly, $R_{EGG}$ can be relatively large, for example, up to 300 mega ohms. Thus, the voltage drop attributable to $R_{EGG}$ can be significant thereby greatly affecting the effective voltage of the pixel area.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

The present disclosure provides architectures and techniques that provide for reduction of effective voltage drops within pixels in active matrix displays.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs More particularly, a display device, such as an electrowetting display device, for example, can be a thin film transistor electrowetting display (TFT-EWD) that generally includes an array of transmissive or reflective pixels configured to be operated by an active matrix addressing scheme. For example, rows and columns of pixels are operated by controlling voltage levels on a plurality of source lines and gate lines. In this fashion, the display device can produce an image by selecting particular pixels to transmit, reflect or block light. Pixels are addressed (e.g., selected) via rows and columns of the source lines and gate lines that are connected to transistors (e.g., used as switches) included in each pixel. Transistors take up a relatively small fraction of the area of each pixel. For example, the transistor can be located underneath the reflector in reflective displays.

Electrically, the pixel is a small capacitor with a layer of insulating optical material (e.g., liquid crystal material or electrowetting material) sandwiched between transparent conductive indium tin oxide (ITO) layers. A one-way current-passing characteristic of the transistor of the pixel prevents charge that is being applied to the pixel from draining between refresh cycles of the display's image.

An electrowetting display employs an applied voltage to change the surface tension of a liquid in relation to a surface. For instance, by applying a voltage to a hydrophobic surface via a pixel electrode in conjunction with a common electrode, the wetting properties of the surface can be modified so that the surface becomes increasingly hydrophilic. Hydrophobic generally refers to repelling fluids while hydrophilic generally refers to having an affinity for fluids. As one example of an electrowetting display, the modification of the surface tension by applying a voltage causes the electrolyte in a liquid in individual pixels of the display to adhere to the modified surface and thus, replace a colored electrowetting oil layer in individual pixels of the display. Thus, the electrowetting fluids in the individual pixels of the display responding to the change in surface tension act as an optical switch. When the voltage is absent, the colored electrowetting oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the low power consumption of electrowetting displays in general makes the technology suitable for displaying content on portable display devices that rely on battery power.

Each pixel of the electrowetting display includes a pixel electrode underneath the liquid within the pixel. In accordance with various embodiments, the pixel electrode has a substantially U-shape. In other words, the pixel electrode has an open end. Since most pixels in electrowetting displays are generally rectangular in shape, e.g., approximately 120 micrometers by 60 micrometers, the pixel electrode is generally an oblong U-shaped pixel electrode with the open end located adjacent to a top portion of the pixel.

Illustrative Structures and Processes

Figure 2A:
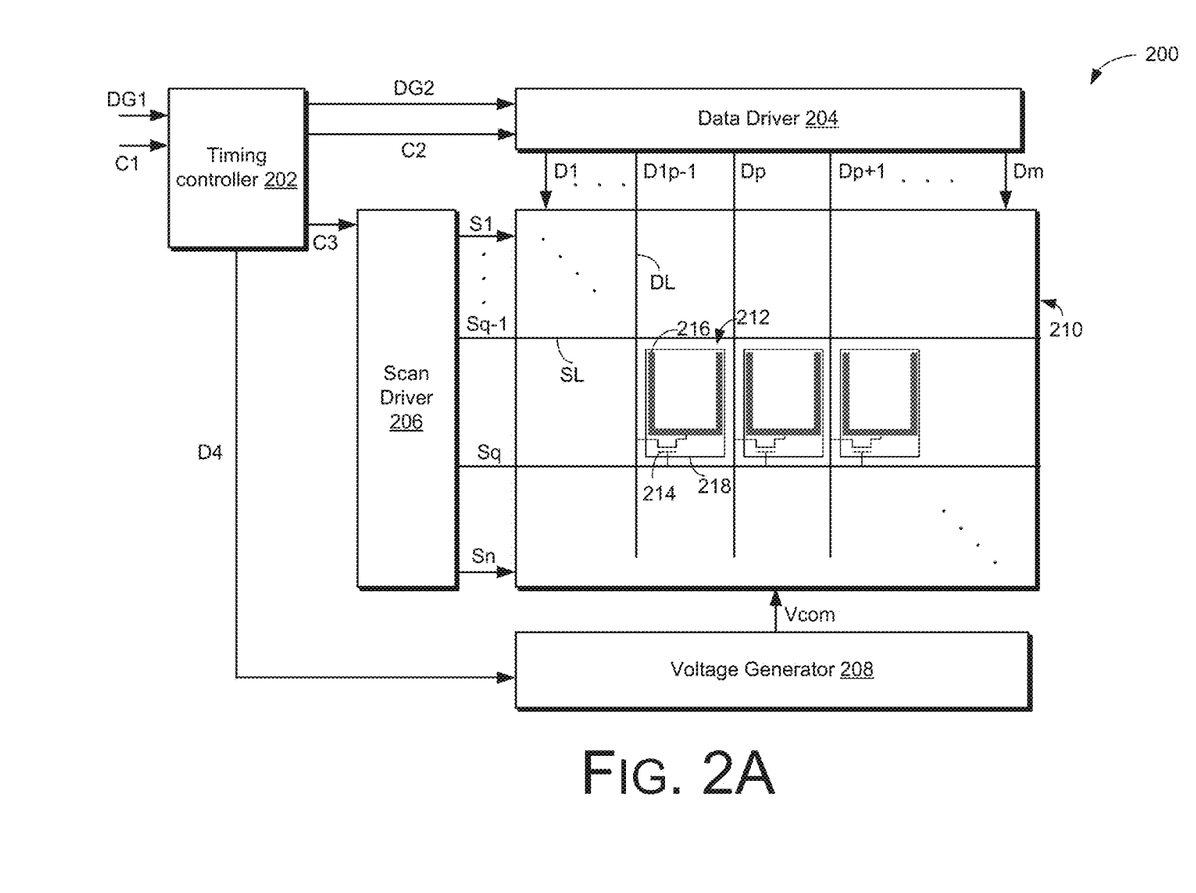
FIG. 2A is a schematic view of an example of an electrowetting display device, according to various embodiments.

Referring to FIG. 2A, an example of an electrowetting display device 200 is schematically illustrated that includes a timing controller 202, a data driver 204, a scan driver 206, a voltage generator 208, and an electrowetting display panel 210. The electrowetting display panel 210 is driven by the timing controller 202, the data driver 204, the scan driver 206, and the voltage generator 208.

As an example of general operation of the electrowetting display device 200, responsive to a first data signal DG1 and a first control signal C1 from an external source, e.g., a graphic controller (not illustrated), the timing controller 202 applies a second data signal DG2 and a second control signal C2 to the data driver 204; a third control signal C3 to the scan driver 206; and a fourth control signal C4 to the voltage generator 208.

The data driver 204 converts the second data signal DG2 to voltages, i.e., data signals, and applies the data signals D1, . . . , Dp−1, Dp, Dp+1, . . . , Dm to the electrowetting display panel 210. The scan driver 206 sequentially applies scan signals S1, . . . , Sq−1, Sq, . . . , Sn to the electrowetting display panel 210 in response to the third control signal C3.

The voltage generator 208 applies a common voltage Vcom to the electrowetting display panel 210 in response to the fourth control signal C4. Although not illustrated in FIG. 2A, the voltage generator 208 generates various voltages required by the timing controller 202, the data driver 204, and the scan driver 206.

The electrowetting display panel 210 includes m data lines DL, i.e., source lines, to transmit the data voltages and n gate lines SL, i.e., scan lines, to transmit a gate-on signal.

Pixel areas 212 are positioned adjacent to crossing points of the data lines DL and the gate lines SL crossing the data lines DL. Each pixel area 212 is made up of a hydrophobic surface that includes a thin film transistor 214 and a pixel electrode 216 under the hydrophobic surface, as will be explained in more detail herein. A partition wall 218 defines the pixel area 212. Pixel areas 212 can represent pixels within the electrowetting display device 200 or sub-pixels within the electrowetting display device 200, depending upon the application for the electrowetting display device 200.

Figure 2B:
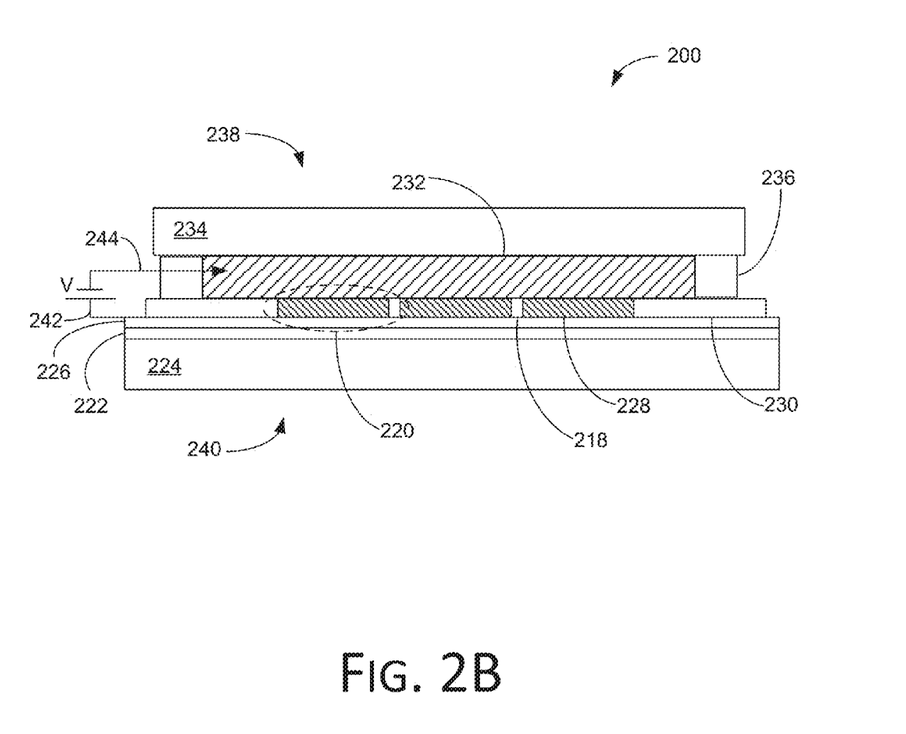
FIG. 2B is a cross-section of a portion of the electrowetting device of FIG. 2A, according to some embodiments.

FIG. 2B is a cross-section of a portion of the electrowetting device 200 showing several electrowetting elements 220 that generally correspond to pixel areas 212, according to some embodiments. An electrode layer 222 that includes the pixel electrodes 216 (not illustrated in FIG. 2B) is formed on a bottom support plate 224. In some implementations, a dielectric barrier layer (not shown) may at least partially separate the electrode layer 222 from a hydrophobic layer 226 also formed on the bottom support plate 224 over the electrode layer 222. Such separation can, among other things, prevent electrolysis occurring through the hydrophobic layer 226. In some implementations, the hydrophobic layer 226 can comprise a fluoropolymer, such as AF1600, produced by DuPont, based in Wilmington, Del. The pixel walls 218 form a patterned electrowetting element grid on the hydrophobic layer 226, as can be seen in FIG. 2A. The pixel walls 218 may comprise a photoresist material, such as epoxy-based negative photoresist SU-8. The patterned electrowetting element grid comprises rows and columns that form an electrowetting element array (e.g., electrowetting display panel 210) of field electrowetting elements and border electrowetting elements. For example, an electrowetting element can have a width and length in a range of about 50 to 500 microns. A first fluid 228, which can have a thickness in a range of about 1 to 10 microns, for example, overlies the hydrophobic layer 226. The first fluid 228 is generally an electrowetting oil and is partitioned by the pixel walls 218 of the patterned electrowetting element grid. An outer rim 230 can comprise the same material as the pixel walls 218. A second fluid 232, such as a fluid that includes an electrolyte, overlies the electrowetting oil 228 and the pixel walls 218 of the patterned electrowetting element grid.

A top support plate 234 covers the second fluid 232 and edge seals 236 retain the second fluid 232 over the electrowetting element array. The bottom support plate 224 and the top support plate 234 may be separate parts of individual electrowetting elements or the bottom support plate 224 and the top support plate 234 may be shared by a plurality of electrowetting elements. The bottom support plate 224 and the top support plate 234 may be made of glass or polymer and may be rigid or flexible, for example.

A voltage V applied across the second fluid 232 and the dielectric barrier layer stack (e.g., comprising the electrode layer 222 and the hydrophobic layer 226) of individual electrowetting elements can control transmittance or reflectance of the individual electrowetting elements.

The electrowetting display device 200 has a viewing side 238 on which an image or display formed by the electrowetting display device 200 can be viewed, and a rear side 240. The top support plate 234 faces viewing side 238 and the bottom support plate 224 faces the rear side 240. In an alternative embodiment, the electrowetting display device 200 may be viewed from the rear side 240. The electrowetting display device 200 may be a reflective, transmissive or transreflective type. The electrowetting display device 200 may be a segmented display type in which the image is built up of segments. The segments can be switched simultaneously or separately. Each segment includes one electrowetting element 220 or a number of electrowetting elements 220 that may be neighboring or distant from one another. The electrowetting elements 220 included in one segment are switched simultaneously, for example. The electrowetting display device 200 may also be an active matrix driven display type or a passive matrix driven display, just to name a few examples.

The second fluid 232 is immiscible with the first fluid 228. Generally, immiscible refers to the inability of the second fluid 232 to mix or blend with the first fluid 228. The second fluid 232 generally includes an electrolyte and is electrically conductive or polar. The second fluid 232 may be water or a salt solution such as a solution of potassium chloride in a mixture of water and ethyl alcohol, for example. The second fluid 232 is preferably transparent, but may be colored, white, absorbing or reflecting. The first fluid 228, generally referred to as electrowetting oil, is electrically non-conductive and may for instance be an alkane like hexadecane or (silicone) oil. The hydrophobic layer 226 is arranged on the bottom support plate 224 to create an electrowetting surface area. The hydrophobic character causes the first fluid 228 to adhere preferentially to the bottom support plate 224 since the first fluid 228 has a higher wettability with respect to the surface of the hydrophobic layer 226 than it has with respect to the second fluid 232. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

The electrode layer 222 is separated from the first fluid 228 and the second fluid 232 by an insulator, which may be the hydrophobic layer 226. The electrode layer 222 (and thereby the electrodes 216) is supplied with voltage signals V by a first signal line 242 as will be further described herein. A second signal line 244 is electrically connected to a top electrode (not illustrated) that is in contact with the conductive second fluid 232. This top electrode may be common to more than one electrowetting element 220 since the electrowetting elements 220 are fluidly interconnected by and share the second fluid 232 uninterrupted by the pixel walls 218. The electrowetting elements 220 are controlled by the voltage V applied between the first and second signal lines 242 and 244.

The first fluid 228 absorbs at least a part of the optical spectrum. The first fluid 228 may be transmissive for a part of the optical spectrum, forming a color filter. For this purpose, the first fluid 228 may be colored by addition of pigment particles or dye, for example. Alternatively, the first fluid 228 may be black (e.g., absorbing substantially all parts of the optical spectrum) or reflecting. The hydrophobic layer 226 may be transparent or reflective. A reflective layer may reflect the entire visible spectrum, making the layer appear white, or part of it, making it have a color.

When the voltage V applied between the signal lines 242 and 226 is set at a non-zero active signal level, the electrowetting element 220 will enter into an active state. Electrostatic forces will move the second fluid 232 toward the electrode layer 222, thereby repelling the first fluid 228 from the area of the hydrophobic layer 226 to the pixel walls 218 surrounding the area of the hydrophobic layer 226, to a drop-like form. This action uncovers the first fluid 228 from the surface of the hydrophobic layer 226 of the electrowetting element 220. When the voltage across the electrowetting element 220 is returned to an in-active signal level of zero or a value near to zero, the electrowetting element 220 will return to an inactive state, where the first fluid 228 flows back to cover the hydrophobic layer 226. In this way, the first fluid 228 forms an electrically controllable optical switch in each electrowetting element 220.

Figure 2C:
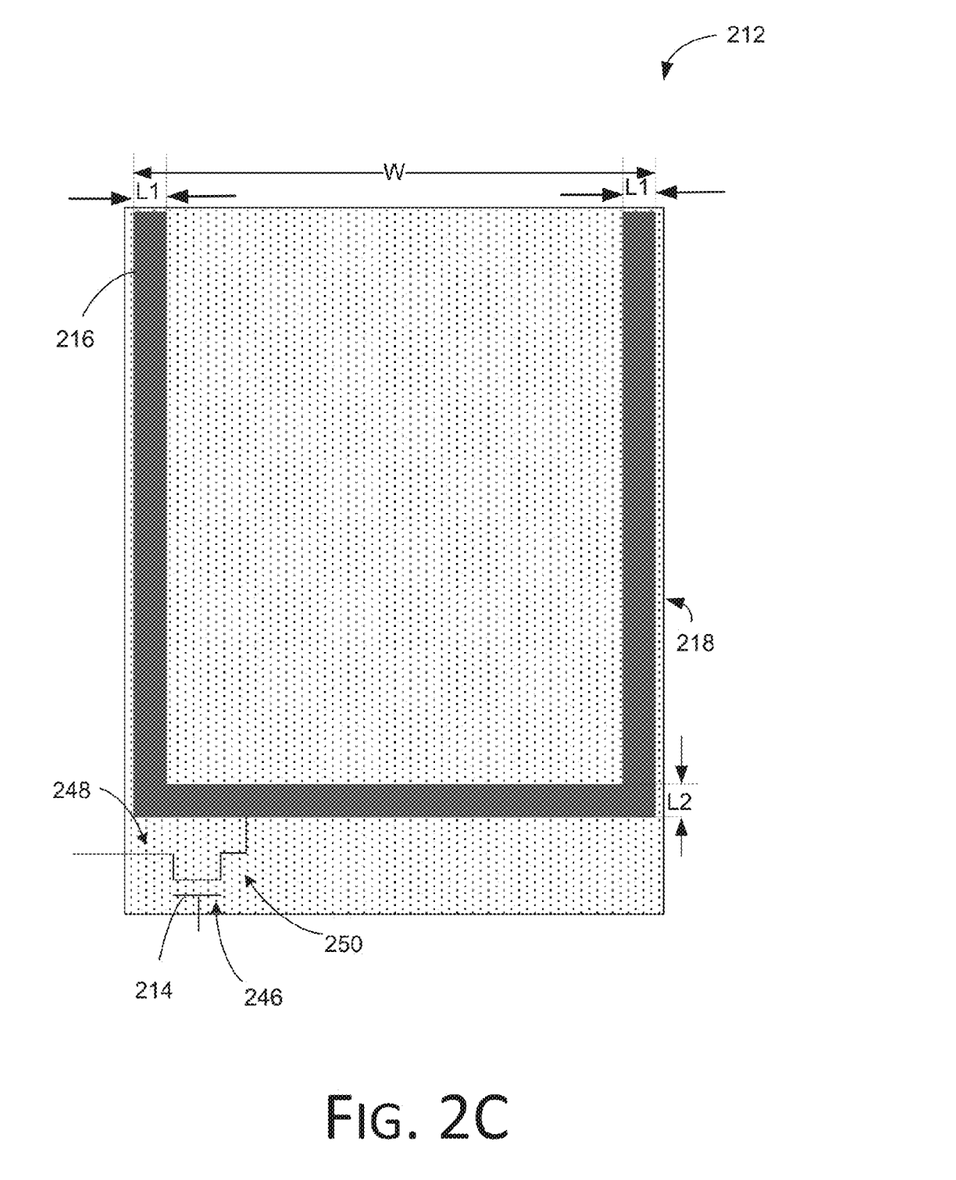
FIG. 2C is an enlarged view of a pixel area of the electrowetting display device of FIGS. 2A and 2B, according to various embodiments.

As can be seen in FIG. 2C, which is an enlarged view of the pixel area 212, the thin film transistor 214 includes a gate electrode 246 that is electrically connected to a corresponding scan line (not illustrated in FIG. 2C) of the scan lines SL, a source electrode 248 electrically connected to a corresponding data line (e.g., first signal line 242 of FIG. 2B) of the data lines DL, and a drain electrode 250 electrically connected to the pixel electrode 216. Thus, the pixel areas 212 are operated based upon the scan lines SL and the data lines DL of FIG. 2A.

As can be seen in FIGS. 2A and 2C, the pixel electrode 216 has a substantially U-shape relative to a corresponding pixel area 212. More generally, the pixel electrode 216 has an open-ended shape relative to a corresponding pixel area 212. Generally, conventional pixel electrodes have a shape and size corresponding to the pixel areas 212. Thus, the open-ended, substantially U-shape of the pixel area is also with respect to conventional pixel electrodes, which are generally substantially rectangular in shape corresponding to the shape of the pixel areas. As previously noted, the pixel electrodes 216 are generally defined in the electrode layer 222 of the electrowetting device 200 of FIG. 2B). As can be seen in FIG. 2C, the width L1 of the arms in the U-shaped pixel electrode 216 is generally in a range of 0.02-0.2 the width W of the electrode 216 and the height L2 of the base portion of the U-shaped pixel electrode 216 is generally in a range of 0.02-0.2 the width W of the pixel electrode 216. Furthermore, the arms of the U-shape pixel electrode 216 can have different dimensions with respect to one another. While FIG. 2C illustrates the pixel electrode 216 as being "rigid" and having substantially straight lines and substantially square corners, the U-shape of the pixel electrode 216 can be smooth with curves and less rigid.

In the embodiment illustrated in FIGS. 2A and 2B, the open end of the U-shaped pixel electrode 216 is near the top of the pixel area 212. If desired, in accordance with other embodiments, the open end of the U-shaped pixel electrode 216 can be towards the bottom of the pixel area 212. In other words, in accordance with various embodiments, the pixel electrodes 216 can be inverted in an inverted U-shape. In such an embodiment, the corresponding thin film transistors 214 would be moved somewhere along the corresponding data lines DL and scan lines SL. The inverted U-shape of the pixel electrode 216 can be "rigid" and have substantially straight lines and substantially square corners, or the inverted U-shape of the pixel electrode 216 can be smooth with curves and less rigid. Furthermore, the arms of the inverted U-shape can have different dimensions with respect to one another.

In accordance with various embodiments, if the pixel area 212 has a more square shape, then the open end of the U-shaped pixel electrode 216 can face sideways, i.e., the pixel electrode can have a substantially C-shape or a backwards C-shape (i.e., a sideways U-shape). If a C-shape or backwards C-shape is used in a substantially rectangular shaped pixel area 212, or even in a substantially square shaped pixel area 212, improved collection may be needed for the first fluid 228. Once again the corresponding thin film transistors 214 would be moved accordingly along the corresponding data lines DL and scan lines SL. The dimensions and relationships of a C-shape pixel electrode and backwards C-shape pixel electrode are generally similar to the U-shape and inverted U-shape pixel electrodes described previously. Furthermore, the arms of the C-shape and the backwards C-shape can have different dimensions with respect to one another. The C-shape and backwards C-shape of the pixel electrode 216 can be "rigid" and have substantially straight lines and substantially square corners, or the C-shape and backwards C-shape of the pixel electrode 216 can be smooth with curves and less rigid.

In operation, in response to the voltage applied to a pixel electrode 216 within a corresponding pixel area 212, the second fluid 232 within the corresponding pixel area 212 contacts the corresponding hydrophobic layer 226 underneath, thus replacing the first fluid 228 within the corresponding pixel area 212. With respect to FIG. 2C, the first fluid 228 will move up and down within the corresponding pixel area 212 in response to a voltage applied to the pixel. By utilizing the open-ended pixel electrode 216, the surface area of the pixel electrode 216 is reduced with respect to conventional pixel electrodes. As previously noted, and as can be seen in FIG. 2C, the width L1 of the arms in the U-shaped pixel electrode 216 is generally in a range of 0.02-0.2 the width W of the pixel electrode 216 and the height L2 of the base portion of the U-shaped pixel electrode 216 is generally in a range of 0.02-0.2 the width W of the pixel electrode 216. Generally, a conventional pixel electrode has close to the same surface area as the pixel area 212. Thus, the U shaped pixel electrode 216 has a reduced surface area of with respect to a conventional pixel electrode. This reduction in surface area of the pixel electrode 216 results in a nearly 70 percent drop in the capacitance of the pixel area, i.e., $C_{ew}$. More particularly, the capacitance Cew of the pixel electrode 216 may be approximately 0.3 of the $C_{ew}$ utilizing a conventional pixel electrode in a pixel area 212 having a size of, for example, 120 micrometers by 60 micrometers. Accordingly, the voltage drop within a pixel utilizing the U shaped pixel electrode 216 is reduced based upon Equation 1 listed previously. For this example, with a pixel area measuring approximately 120 micrometers by 60 micrometers, and L1=L2=8 micrometers, the voltage drop attributable to the resistance $R_{EGG}$ of the electrolyte in the second fluid is approximately 3.23 volts, while the voltage drop utilizing a conventional pixel electrode is approximately 7.58 volts. Furthermore, utilizing U-shaped pixel electrodes 216 also produces good white levels within the electrowetting display 200 and thus, the electrowetting display 200 utilizing U-shaped pixel electrodes 216 has good brightness. Use of U-shaped electrodes 216 also helps in motion control of the first fluid 228 and thus, also reproducibility of the grey levels within an array of pixels. Use of U-shaped pixel electrodes 216 allows for good control of movement of the first fluid 228 in comparison to use of conventional shaped pixel electrodes.

While U-shaped pixel electrode 216 has been described with reference to an electrowetting device 200, it is to be noted that the U-shaped pixel electrode 216 may be used with other types of display devices.

Figure 3:
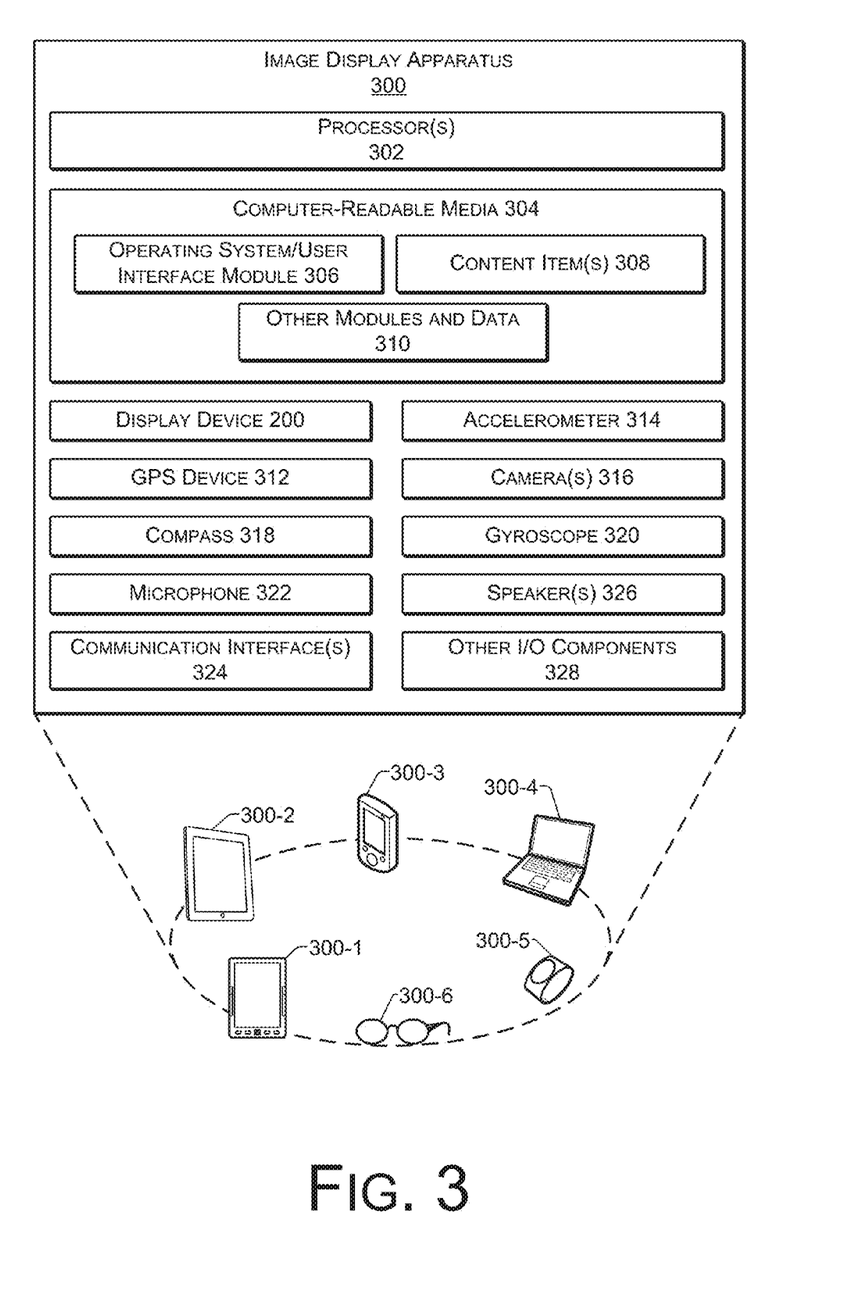
FIG. 3 illustrates select components of an example image display apparatus that may include an electrowetting display, according to various embodiments.

FIG. 3 illustrates select example components of an example image display apparatus 300 that may be used with the electrowetting display device 200 according to some implementations. The image display apparatus 300 may be implemented as any of a number of different types of electronic devices. Some examples of the image display apparatus 300 may include digital media devices and eBook readers 300-1; tablet computing devices 300-2; smart phones, mobile devices and portable gaming systems 300-3; laptop and netbook computing devices 300-4; wearable computing devices 300-5; augmented reality devices, helmets, goggles or glasses 300-6; and any other device capable of connecting with the electrowetting display device 200 and including a processor and memory for controlling the display according to the techniques described herein.

In a very basic configuration, the image display apparatus 300 includes, or accesses, components such as at least one control logic circuit, central processing unit, or processor 302, and one or more computer-readable media 304. Each processor 302 may itself comprise one or more processors or processing cores. For example, the processor 302 can be implemented as one or more microprocessors, microcomputers, microcontrollers, digital signal processors, central processing units, state machines, logic circuitries, and/or any devices that manipulate signals based on operational instructions. In some cases, the processor 302 may be one or more hardware processors and/or logic circuits of any suitable type specifically programmed or configured to execute the algorithms and processes described herein. The processor 302 can be configured to fetch and execute computer-readable instructions stored in the computer-readable media 304 or other computer-readable media. The processor 302 can perform one or more of the functions attributed to the timing controller 202, the data driver 204, and/or the scan driver 206 of the electrowetting display device 200. The processor 302 can also perform one or more functions attributed to a graphic controller (not illustrated) for the electrowetting display device.

Depending on the configuration of the image display apparatus 300, the computer-readable media 304 may be an example of tangible non-transitory computer storage media and may include volatile and nonvolatile memory and/or removable and non-removable media implemented in any type of technology for storage of information such as computer-readable instructions, data structures, program modules or other data. The computer-readable media 304 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 300 may access external storage, such as RAID storage systems, storage arrays, network attached storage, storage area networks, cloud storage, or any other medium that can be used to store information and that can be accessed by the processor 302 directly or through another computing device or network. Accordingly, the computer-readable media 304 may be computer storage media able to store instructions, modules or components that may be executed by the processor 302.

The computer-readable media 304 may be used to store and maintain any number of functional components that are executable by the processor 302. In some implementations, these functional components comprise instructions or programs that are executable by the processor 302 and that, when executed, implement operational logic for performing the actions attributed above to the image display apparatus 300. Functional components of the image display apparatus 300 stored in the computer-readable media 304 may include the operating system and user interface module 306 for controlling and managing various functions of the image display apparatus 300, and for generating one or more user interfaces on the electrowetting display device 200 of the image display apparatus 300.

In addition, the computer-readable media 304 may also store data, data structures and the like, that are used by the functional components. For example, data stored by the computer-readable media 304 may include user information and, optionally, one or more content items 308. Depending on the type of the image display apparatus 300, the computer-readable media 304 may also optionally include other functional components and data, such as other modules and data 310, which may include programs, drivers and so forth, and the data used by the functional components. Further, the image display apparatus 300 may include many other logical, programmatic and physical components, of which those described are merely examples that are related to the discussion herein. Further, while the figures illustrate the functional components and data of the image display apparatus 300 as being present on the image display apparatus 300 and executed by the processor 302 on the image display apparatus 300, it is to be appreciated that these components and/or data may be distributed across different computing devices and locations in any manner.

FIG. 3 further illustrates examples of other components that may be included in the image display apparatus 300. Such examples include various types of sensors, which may include a GPS device 312, an accelerometer 314, one or more cameras 316, a compass 318, a gyroscope 320, a microphone 322, and so forth.

The image display apparatus 300 may further include one or more communication interfaces 324, which may support both wired and wireless connection to various networks, such as cellular networks, radio, Wi-Fi networks, close-range wireless connections, near-field connections, infrared signals, local area networks, wide area networks, the Internet, and so forth. The communication interfaces 324 may further allow a user to access storage on or through another device, such as a remote computing device, a network attached storage device, cloud storage, or the like.

The image display apparatus 300 may further be equipped with one or more speakers 326 and various other input/output (I/O) components 328. Such I/O components 328 may include a touchscreen and various user controls (e.g., buttons, a joystick, a keyboard, a keypad, etc.), a haptic or tactile output device, connection ports, physical condition sensors, and so forth. For example, the operating system 306 of the image display apparatus 300 may include suitable drivers configured to accept input from a keypad, keyboard, or other user controls and devices included as the I/O components 328. Additionally, the image display apparatus 400 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device comprising a plurality of pixel areas, wherein each pixel area comprises:
a hydrophobic surface;
an electrowetting oil on the hydrophobic surface and a fluid that includes an electrolyte on the electrowetting oil;
a pixel electrode under the hydrophobic surface and having a first width W1, wherein the pixel electrode comprises a first arm coupled to a base portion and a second arm coupled to the base portion such that the pixel electrode has a substantially U-shape, wherein the first arm has a first shape and the second arm has a second shape, wherein the first shape and the second shape are substantially the same, wherein the first arm has a second width W2, the second arm has a third width W3 and the base portion has a height H, and wherein the second width W2 and the third width W3 are in a range of 0.02-0.2 of the first width W1 of the pixel electrode and the height H is in a range of 0.02-0.2 of the first width W1 of the pixel electrode; and
a thin film transistor coupled to the pixel electrode and a voltage source,
wherein voltage via the thin film transistor and the voltage source applied to the hydrophobic surface via the pixel electrode causes the hydrophobic surface to become more hydrophilic to thereby move the fluid that includes the electrolyte onto the hydrophobic surface to thereby substantially displace the electrowetting oil on the hydrophobic surface.

2. The electrowetting display device of claim 1, wherein each pixel area represents one of (i) a pixel of the electrowetting display device or (ii) a sub-pixel area of the electrowetting device.

3. The electrowetting display device of claim 1, wherein each pixel area has a size of about 120 micrometers by about 60 micrometers, and wherein the second width W2 is about 8 micrometers and the third width W3 is about 8 micrometers.

4. The electrowetting display device of claim 1, wherein each pixel area represents one of (i) a pixel of the electrowetting display device or (ii) a sub-pixel of the electrowetting display device.

5. An electrowetting display device comprising a plurality of pixel areas, wherein each pixel area comprises:
a hydrophobic surface;
a first fluid and a second fluid on the hydrophobic surface, wherein the first fluid is immiscible with the second fluid; and a pixel electrode under the hydrophobic surface, wherein
the pixel electrode has an open-ended shape comprising a
first arm coupled to a base portion and a second arm
coupled to the base portion,
the first arm has a first shape and a first width and the
second arm has a second shape and a second width,
the first width is substantially constant along a length of
the first arm and the second width is substantially
constant along a length of the second arm,
the first shape and the second shape are substantially the
same,
the pixel electrode has a third width,
the first arm having the first width, the second arm having
the second width and
the base portion having a height, and
the first width and the second width are in a range of
0.02-0.2 of the third width of the pixel electrode and the
height is in a range of 0.02-0.2 of the third width of the
pixel electrode.

6. The electrowetting display device of claim 5, wherein the open-ended shape of the pixel electrode has one of (i) a substantially U-shape, (ii) a substantially inverted U-shape, (iii) a substantially C-shape, and (iv) a substantially backwards C-shape.

7. The electrowetting device of claim 5, wherein each pixel area represents one of (i) a pixel of the electrowetting display device or (ii) a sub-pixel of the electrowetting display device.

8. The electrowetting device of claim 5, wherein the first fluid is an electrowetting oil and the second fluid is a fluid that includes an electrolyte.

9. The electrowetting device of claim 5, wherein each pixel area has a size of about 120 micrometers by about 60 micrometers, and wherein the first width is about 8 micrometers and the second width is about 8 micrometers.

10. An image display apparatus comprising an electrowetting display device comprising a plurality of pixel areas, wherein each pixel area comprises:
a hydrophobic surface;
a first fluid and a second fluid on the hydrophobic surface, wherein the first fluid is immiscible with the second fluid;
a pixel electrode under the hydrophobic surface, wherein the pixel electrode has an open-ended shape comprising a first arm having a first width and coupled to a base portion and a second arm having a second width and coupled to the base portion, wherein the first width is substantially constant along a length of the first arm and the second width is substantially constant along a length of the second arm; and
a thin film transistor coupled to the pixel electrode and a voltage source,
wherein voltage via the thin film transistor and the voltage source applied to the hydrophobic surface via the pixel electrode causes the hydrophobic surface to become more hydrophilic to thereby move the second fluid onto the hydrophobic surface to thereby substantially displace the first fluid on the hydrophobic surface, and
wherein each pixel area has a size of about 120 micrometers by about 60 micrometers, and wherein the first width is about 8 micrometers and the second width is about 8 micrometers.

11. The image display apparatus of claim 10, wherein the open-ended shape of the pixel electrode has one of (i) a substantially U-shape, (ii) a substantially inverted U-shape, (iii) a substantially C-shape, and (iv) a substantially backwards C-shape.

12. The image display apparatus of claim 11, wherein the pixel electrode has a third width, the first arm has the first width, the second arm has the second width and the base portion has a height, and wherein the first width and the second width are in a range of 0.02-0.2 of the third width of the pixel electrode and the height is in a range of 0.02-0.2 of the third width of the pixel electrode.

13. The image display apparatus of claim 10, wherein each pixel area represents one of (i) a pixel of the electrowetting display device or (ii) a sub-pixel of the electrowetting display device.

14. The image display apparatus of claim 10, wherein the image display apparatus comprises one of a digital media device, an eBook reader, a tablet computing device, a smart phone, a portable gaming system, a laptop computing device, a netbook computing device, a wearable computing device, or an augmented reality device.

15. The image display apparatus of claim 10, wherein the first fluid is an electrowetting oil and the second fluid is a fluid that includes an electrolyte.

16. An electrowetting display device comprising a plurality of pixel areas, wherein each pixel area comprises:
a hydrophobic surface;
a first fluid and a second fluid on the hydrophobic surface, wherein the first fluid is immiscible with the second fluid;
a pixel electrode under the hydrophobic surface and having a first width W1, wherein the pixel electrode has an open-ended shape comprising (i) a first arm having a second width W2 and coupled to a base portion having a height H, and (ii) a second arm having a third width W3 and coupled to the base portion, wherein the first arm has a first shape and the second arm has a second shape, and wherein the first shape and the second shape are substantially the same, and wherein the second width W2 and the third width W3 are in a range of 0.02-0.2 of the first width W1 of the pixel electrode and the height H is in a range of 0.02-0.2 of the first width W1 of the pixel electrode; and
a thin film transistor coupled to the pixel electrode and a voltage source.

* * * * *